(12) United States Patent
Böhm et al.

(10) Patent No.: US 7,444,854 B2
(45) Date of Patent: *Nov. 4, 2008

(54) LEAK INDICATOR WITH TEST LEAK AND TEST LEAK FOR INTEGRATION INTO A LEAK DETECTOR

(75) Inventors: Thomas Böhm, Köln (DE); Werner Grosse Bley, Bonn (DE); Randolf Rolff, Kerpen-Horrem (DE); Sandra Seitz, Dusseldorf (DE); Norbert Rolff, Horrem (DE)

(73) Assignee: Inficon GmbH (DE)

( * ) Notice: Subject to any disclaimer, the term of this patent is extended or adjusted under 35 U.S.C. 154(b) by 176 days.

This patent is subject to a terminal disclaimer.

(21) Appl. No.: 11/504,831

(22) Filed: Aug. 16, 2006

(65) Prior Publication Data

US 2007/0039377 A1  Feb. 22, 2007

Related U.S. Application Data

(63) Continuation-in-part of application No. 10/471,925, filed as application No. PCT/EP02/02845 on Mar. 11, 2002, now Pat. No. 7,107,821.

(30) Foreign Application Priority Data

Apr. 11, 2001 (DE) .................................. 101 18 085

(51) Int. Cl.
*G01M 3/20* (2006.01)
(52) U.S. Cl. .................... 73/40.7; 73/1.04; 73/1.05; 73/1.06; 73/1.07
(58) Field of Classification Search ............... 73/40.7, 73/40, 1.01, 1.02, 1.04, 1.05, 1.06
See application file for complete search history.

(56) References Cited

U.S. PATENT DOCUMENTS

| 2,947,166 | A | 8/1960 | Palmer et al. |
| 2,979,937 | A | 4/1961 | Chausson |
| 2,981,091 | A | 4/1961 | Roberts |
| 3,027,753 | A | 4/1962 | Harder, Jr. |
| 3,486,365 | A | 12/1969 | Briggs |
| 3,786,675 | A | 1/1974 | Delatorre et al. |

(Continued)

FOREIGN PATENT DOCUMENTS

| DE | 29 26 112 | 1/1981 |
| DE | 691 03 925 | 2/1995 |
| DE | 44 45 829 | 6/1996 |
| DE | 199 03 097 | 8/2000 |
| DE | 199 11 260 A1 | 9/2000 |
| EP | 0 444 434 | 9/1991 |
| FR | 2 767 197 | 2/1999 |

*Primary Examiner*—Michael Cygan
(74) *Attorney, Agent, or Firm*—Marjama Muldoon Blasiak & Sullivan LP

(57) ABSTRACT

A leak test apparatus includes a housing having an interior sized for retaining a plurality of instrument components including a control unit. A sniffer gun is linked to the instrument components, the sniffer gun having an intake point, and a test leak includes a gas reservoir, a constriction, an opening suited for introducing the intake point of said sniffer gun, and a temperature sensor. The temperature sensor is linked, either by means of a wired connection or wirelessly to the control unit for signal transfer.

16 Claims, 2 Drawing Sheets

U.S. PATENT DOCUMENTS

| | | | |
|---|---|---|---|
| 4,016,743 A | 4/1977 | Henderson et al. | |
| 5,010,761 A | 4/1991 | Cohen et al. | |
| 5,767,391 A | 6/1998 | Wong et al. | |
| 5,777,203 A | 7/1998 | Stymne et al. | |
| 5,889,199 A | 3/1999 | Wong et al. | |
| 5,907,092 A | 5/1999 | Bohm et al. | |
| 6,189,369 B1 | 2/2001 | Yokogi et al. | |
| 6,550,313 B1 | 4/2003 | Flosbach et al. | |
| 7,107,821 B2 * | 9/2006 | Bohm et al. | 73/40.7 |
| 7,168,287 B2 * | 1/2007 | Rolff | 73/1.05 |

* cited by examiner

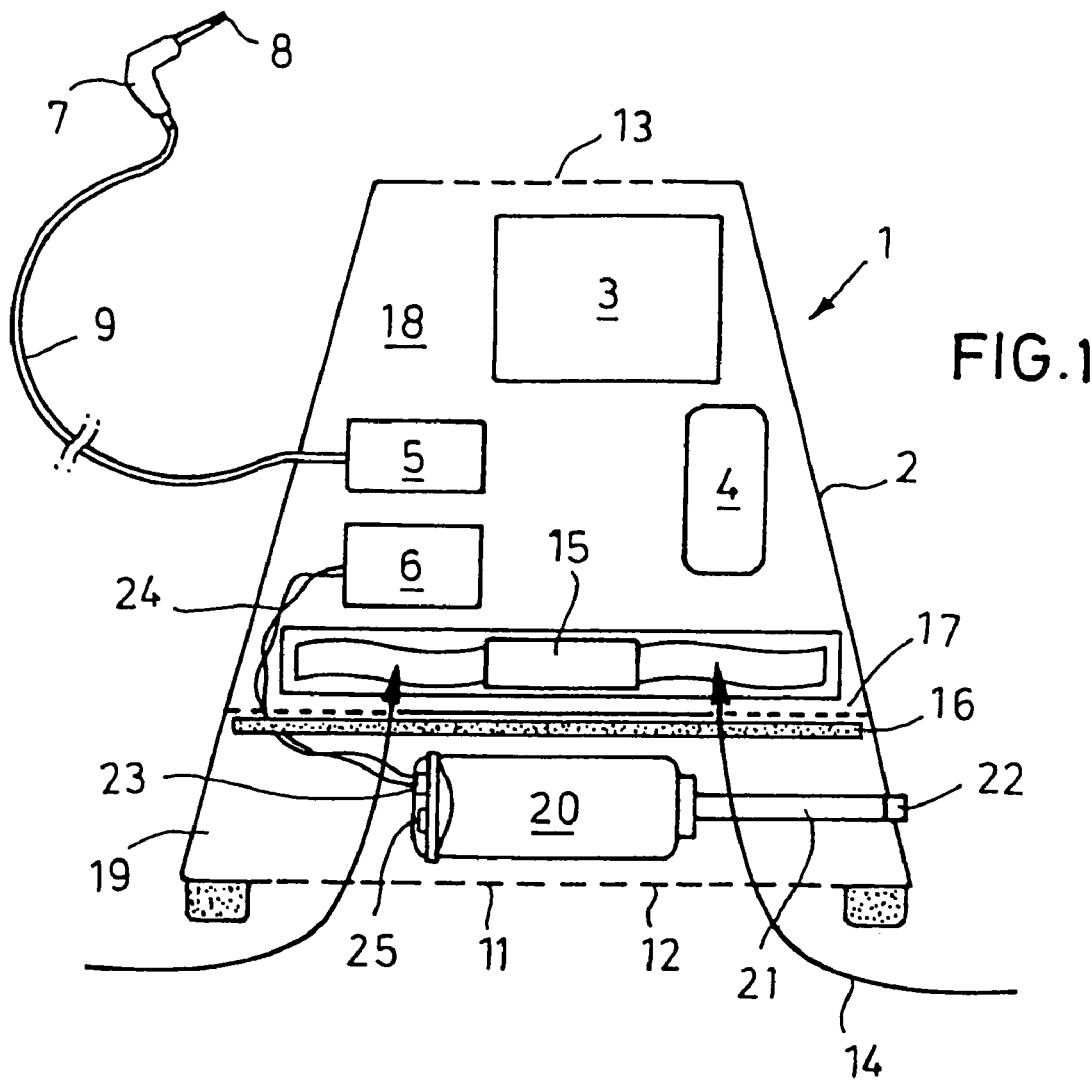
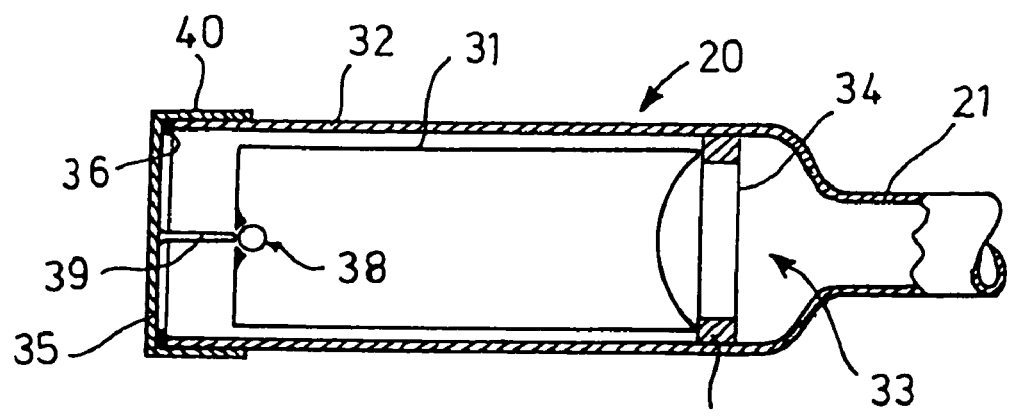

LEAK INDICATOR WITH TEST LEAK AND TEST LEAK FOR INTEGRATION INTO A LEAK DETECTOR

CROSS REFERENCE TO RELATED APPLICATIONS

This application is a continuation-in-part application of U.S. Ser. No. 10/471,925, filed Mar. 3, 2004, is a national stage application under 35 USC §371 of PCT Application No. PCT/EP02/02845, filed Mar. 11, 2001, which claims priority of German Application No. 101 18 085.3, filed on Apr. 11, 2001, the entire contents of which are herein incorporated by reference.

FIELD OF THE INVENTION

The present invention relates to a leak indicator as well as a test leak suitable for integration into a leak indicator.

BACKGROUND OF THE INVENTION

Stringent requirements as to leaktightness are imposed on many systems and products in industry and research. It depends on the type of leak, leak rate or the size of the leak which leak searching method is applied, respectively, which leak indicator is employed.

In the instance of units under test or subassemblies manufactured in the refrigerants, automotive or other industries, the method of sniffer leak detection is frequently employed. This requires, that there be present in the unit under test or subassembly a test gas, preferably at an overpressure. Frequently, helium is employed as the test gas, which is introduced before sealing into the hollow spaces which are to be analyzed for the presence of leaks. It is also known to employ gases present anyway in the units under test or subassemblies as the test gas, for example, SF6 or halogen gases in the refrigerants industry.

The unit under test which is to be analyzed for the presence of leaks is scanned with the aid of the intake point (tip) of a sniffer gun, whereby said tip accepts the test gas escaping from a possibly present leak and supplies it to a test gas detector. This test gas detector may be accommodated together with other components within an instrument to which the sniffer gun is linked, among other things, through a hose. If the detector is sufficiently small (for example, an infrared gas analyzer) then it also may be accommodated in the gun itself, thereby significantly reducing the response time.

Test gas leak indicators need to be calibrated frequently. To this end, it is known to employ test leaks exhibiting a defined leakage. Test leaks for these purposes comprise a gas reservoir and a constriction of known conductance. To calibrate a leak indicator with a sniffer gun, the sniffer tip is brought in to the vicinity of the constriction, and the leak rate indication is adjusted.

Test leaks should exhibit, over a time which is as long as possible (significantly over one year), a constant gas flow and should be, moreover, so small that they can be accommodated within the housing of a leak indicator. This requires that the test gas be present in the test leak at a high pressure (8 bar and more). Test leaks of this kind are temperature sensitive. This applies in particular when the test gas is in the liquid state at the pressures stated. For safety reasons, a maximum temperature must not be exceeded. Installing a test leak of this kind within a leak indicator in which heat generating components are present, causes problems.

SUMMARY OF THE INVENTION

According to one version, a leak test apparatus is provided, the apparatus including a housing having an interior sized for retaining a plurality of instrument components, the components including a control unit. The apparatus further includes a sniffer gun linked to the instrument components, the sniffer gun having an intake point, and a test leak including a gas reservoir, a constriction, an opening suited for introducing the intake point of the sniffer gun and a temperature sensor that is linked to the control unit for signal transfer.

The test leak also preferably includes an EEPROM, the latter having at least one of production date, filling quantity and leak rate data stored within. The EEPROM is also linked to the control unit for control transfer, wherein the link is either by means of a wired connection or wirelessly. The test leak can also include a processor and data storage means that are linked to the EEPROM.

The housing of the leak test apparatus preferably includes a port which is sized to permit the leak test to be selectively insertable into and removable from the housing through the port. The leak test apparatus including the EEPROM and processor also can include a transmitter to facilitate wireless transmission with the control unit while the test leak is removed from the housing.

Preferably, the gas reservoir of the test leak is located in a pressure vessel and an outer housing is provided for receiving the pressure vessel in which the constriction is provided as a component of the outer housing. The constriction can be, according to one version, a diaphragm. In one version, the pressure vessel and the outer housing are each cylindrically shaped with the constriction being located in one face side of the outer housing and in which a releasable screw cap is provided in an opposite face side of the outer housing.

The outer housing includes a flange in the face side opposite that of the releasable screw cap, the flange extending inwardly toward the interior of the outer housing for supporting the pressure vessel containing the gas reservoir and in which the constriction (e.g., diaphragm) is carried by the flange.

The pressure vessel in one version includes a ball valve in the area of the releasable screw cap wherein the screw cap is screwed in place. Alternatively, the screw cap carried a spike that is oriented to penetrate the pressure vessel when the cap is screwed in place. The cap includes a rim having a bore defined in an upper side thereof.

In one version, the outer housing in the area of the constriction, is equipped with a pipe connection. An unoccupied end of the pipe connection forms the opening for introducing the intake point of the sniffer gun.

It is the task of the present invention to install the test leak in such a manner within the housing of a leak indicator that the risk of exceeding maximum permissible temperatures does not exist, and/or to design the test leak itself such that even in the instance of exceeding permissible temperatures a hazard to the users of the leak indicator will not exist.

According to the present invention, the partial task of safely installing the test leak within the housing of a leak indicator is solved. Through these means, it is achieved that the test leak can not attain higher temperatures compared to the ambient temperature. The maximum temperature of the test leak is then at the same time the maximum permissible operating temperature for the leak indicator itself.

The further partial task affecting the design of the test leak is also solved according to the invention. Through the outer housing, it is ensured that even when exceeding the maximum permissible temperatures for the pressurized vessel, a hazard to persons present in the vicinity of the test leak is excluded.

BRIEF DESCRIPTION OF THE DRAWINGS

Further advantages and details of the present invention shall be explained with reference to the examples of embodiments depicted schematically in the following drawings, in which FIG. 1 illustrates a sniffer leak indicator according to the present invention with components contained therein;

FIG. 2 is a sectional view through a test leak in accordance with the present invention;

DETAILED DESCRIPTION

Figure 3:
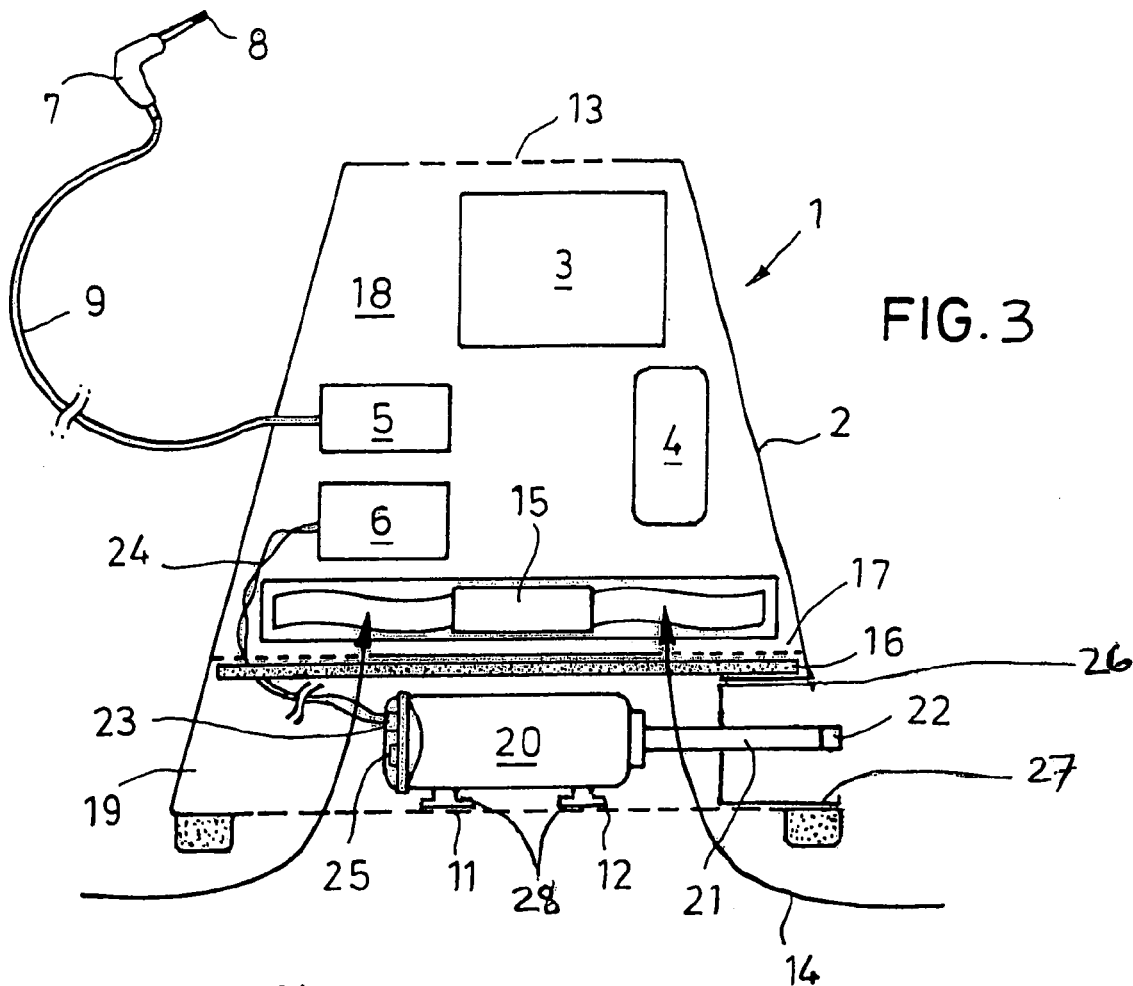
FIG. 3 is a sniffer leak indicator according to another embodiment of the invention.

The leak indicator 1 depicted in FIG. 1 comprises a housing 2 in which the instrument components are accommodated. Presented by way of blocks are, for example, a vacuum pump 3, a power supply 4, the gas detector 5, and a control unit 6. Located outside of the housing 2 is the sniffer gun 7 having an intake point (tip) 8. The sniffer gun 7 is linked via a hose 9 to the gas detector 5. In the instance of the gas detector 5 being accommodated within the sniffer gun 7, it is linked to the control unit 6 via signal lines.

All of the above-noted instrument components are accommodated in an upper section of the housing 2. The housing 2 itself is equipped in a bottom section 11 and in the upper section with cooling air inlets 12 and air slots 13, respectively. Since at least some of the instrument components generate heat, a cooling air flow (arrows 14) is produced through the rising air alone. Should this flow not suffice, an additional fan 15 may be provided supporting the flow of cooling air. In the depicted example of this embodiment, the fan 15 is located beneath the instrument components. A filter mat 16 is provided through which the taken in cooling air is cleaned. Located above the filter mat 16 is a separating plane 17 equipped with air penetration openings, the separating plane limiting towards the bottom the partial space 18 within the housing with the instrument components 3 to 6.

A test leak 20 is accommodated within the leak indicator 1. Said test leak 20 is located below the separating plane 17, such that it is located within an insulated partial section 19 of the housing 2, being thermally separated from partial section 18 of the housing. Fresh cooling air continuously flows around the test leak 20. The separating plane 17, directly above the test leak 20 does not exhibit any penetration openings, as well as the filter mat 16 support the thermal insulation of the partial section 19 of the housing from the partial section 18. The test leak 20 may attain, at most, the temperature of the ambient air.

The test leak 20 has a pipe connection 21 which penetrates the housing 2 towards the outside. The pipe connection 21 forms a commonly continuously open connection between a constriction of the leak indicator 20, said constriction not being depicted in FIG. 1, and an opening 22 suited for introducing the sniffer tip 7. This arrangement allows the leak rate readout to be calibrated at any time.

It is especially expedient to equip a test leak 20 suited for installation within a leak indicator 1 with a gas reservoir 31 and a constriction 33—for example, in the vicinity of its constriction—with a temperature sensor 23, said temperature sensor being linked (lines 24) to the control unit 6. These measures allow the temperature dependent penetrability of the constriction of the test leak 20 to be taken into account when calibrating the leak rate readout. In particular and in the instance of test leaks having a diaphragm as the constriction, the above penetrability is significant, since the penetrability of the diaphragm is temperature dependent exponentially.

In order to attain a reliable calibration of the leak indicator 1, the temperature dependence of the test leak 20 is compensated through a correction curve embedded in the software of the instrument (control unit 6). The temperature is measured in the area of the test leak 20. For this purpose, there is located at the bottom of the test leak 20 a printed circuit board with a temperature sensor and an EEPROM. In FIG. 1, the EEPROM is depicted schematically and designated as 25.

The advantage of the concept detailed, is thus that a compact test leak for integration into small benchtop units can be produced in a cost-effective manner. Since in the EEPROM production date, filling quantity as well as leak rate are saved, it is possible to estimate the point of time at which the reservoir has emptied itself and thus the test leak must be exchanged.

FIG. 2 depicts an especially well-suited test leak 20 for installation into a leak indicator in accordance with FIG. 1. The test leak 20 comprises an inner pressure vessel 31 with the gas reservoir. This pressure vessel 31 is a commercially available pressure cell which contains the desired test gas in the liquid state. The pressure in filled cartridges of this kind is severely temperature dependent. Commonly, the pressure must not exceed 8 bar (test pressure 12 bar). The maximum temperature to which pressure cells of this kind may commonly be exposed is limited to 50° C.

In spite of this and also in order to be able to employ pressure vessels of this kind at times at higher ambient temperatures as a gas reservoir for test leaks, a second outer housing 32 is provided. This housing 32 consists, for example, of steel and is rated for significantly higher pressures than 8 (respectively 12) bar. In the area of one face side, the housing includes the constriction 33, being designed by way of a diaphragm 34. A pipe connection 21 follows, as already detailed in connection with FIG. 1. In the area of the other face side there is provided a releasable cap 35, which preferably may be unscrewed. The releasable cap 35 allows the outer housing 32 to close in a sealed manner. Located between its face side opening and the cap 35 is a sealing ring 36. After detaching the releasable cap 35, the inside of the outer housing 32 is accessible for inserting or removing the pressure vessel 31.

In the area of the face side opposing the releasable cap 35, the outer housing 32 is equipped with an inwardly projecting flange 37. This flange 37 carries on its side facing the pipe connection 21, the diaphragm 34. On the side of the flange 37 facing the releasable cap 35, the pressure vessel 31, inserted into the outer housing 32, is supported.

In the example of the embodiment depicted in FIG. 2, the pressure vessel 31 is equipped with a ball valve 38 located in one of its face sides. The pressure vessel 31 is inserted into the outer housing 32 in such a manner that the valve 38 faces the releasable cap 35. The releasable cap 35 is equipped with a pin 39 assigned to the valve 38, the length of said pin being so selected that it opens the valve 38 when the cap 35 is completely screwed on. When employing a pressure vessel without the ball valve 38, there is provided at the location of the pin 39, a spike which provides the pressure vessel 31 with an opening upon closing the cap 35. After closing the releasable cap 35, either the ball valve 38 is open or the opening provided by the spike is present, so that the test gas may flow into the outer housing 32. Crucial to the magnitude of the temperature load is now no longer the pressure vessel 31, but the outer housing 32 instead.

If it is required to replace the pressure vessel 31, the housing 32 is opened by unscrewing the releasable cap 35. The rim of the releasable cap 35 is provided in the vicinity of its upper side with a small bore 40. This allows, before finally unscrewing the releasable cap 35, the pressure to be equalized between the inside of the outer housing 32 and the surroundings.

The special advantage of the test leak 20 in accordance with this embodiment is such that the pressure resistant outer housing 32 will not have to be replaced. With respect to its stability, it may be rated according to the desired requirements. Only during transportation and maintaining the pressure vessel 31 in stock, need the relatively low ambient temperatures be taken into account. Also, the constriction (e.g., diaphragm 34) does not belong to a non-reusable product. This offers the advantage that when changing the gas reservoir, the leak rate of the test leak 20 does not change.

In addition, the test leak 20 is optimally protected when being installed according to the present invention within a leak indicator. Also, the guidance of the cooling air for the instrument over the test leak 20 ensures as the maximum temperature, the ambient temperature in the area of the test leak.

Figure 4:
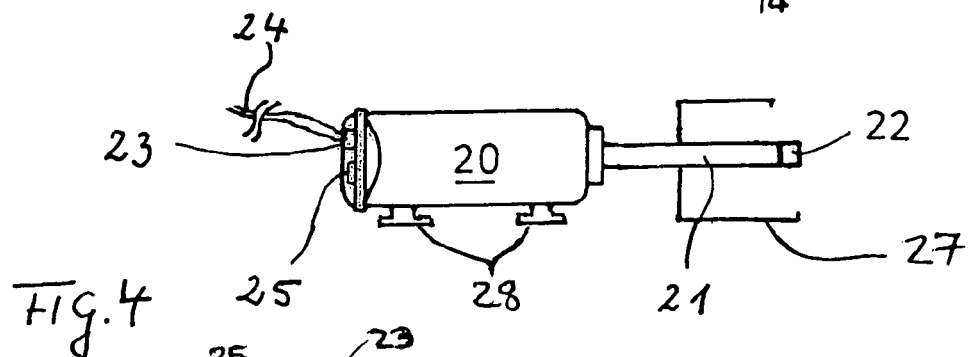
FIG. 4 is an enlarged view of the test leak of FIG. 3.
Figure 5:
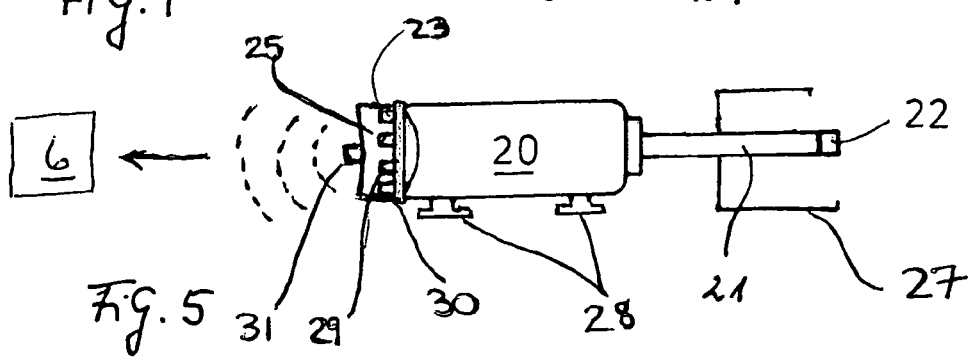
FIG. 5 is a view of a test leak further equipped for wirelessly transmitting with a remote unit.

The connection between the test leak 20 and the control unit 6 can be made through wires 24, as shown according to FIG. 1, or can also be made by means of a wireless connection. A separate embodiment of a leak test is shown in FIGS. 3-5, the test leak being represented as in the preceding by reference numeral 20. In this version, the leak test 20 can include a set a wireless transmitter/receiver 31, as well as a processor 29 and data storage means 30, each of which are linked to the EEPROM 25. The transmitter/receiver 31 includes an antenna and is configured to wirelessly transmit signal information to and from the control unit 6, as shown schematically in FIG. 5.

The lower portion 11 of the test leak apparatus housing 2 can be further equipped with a port 26 that permits the test leak 20 to be selectively inserted into the housing and removed therefrom, as shown in FIG. 3. This port 26 further permits the inclusion of the pipe connection 21 extending from the test leak 20, thereby allowing the test leak to be utilized within the confines of the housing 2 or alternatively outside of the housing, as needed. The test leak 20 according to this embodiment is further equipped with a guiding and supporting element 27 that includes an opening for receiving the unoccupied end of the pipe connection 21. To that end, the test leak 20 further includes a set of support feet 28.

We claim:

1. A leak test apparatus comprising:
   a housing having an interior sized for retaining a plurality of instrument components, said instrument components including a control unit;
   a sniffer gun linked to said instrument components, said sniffer gun having an intake point; and
   a test leak including a gas reservoir, a constriction, an opening suited for introducing the intake point of said sniffer gun, and a temperature sensor, said temperature sensor being linked to the control unit for signal transfer.

2. A leak test apparatus as recited in claim 1, wherein said test leak further includes an EEPROM, said EEPROM having at least one of production date, filling quantity and leak rate data stored within.

3. A leak test apparatus as recited in claim 1, wherein the constriction is a diaphragm.

4. A leak test apparatus as recited in claim 2, wherein the EEPROM is linked to the control unit for signal transfer.

5. A leak test apparatus as recited in claim 4, wherein the link between said EEPROM and said control unit is wireless.

6. A leak test apparatus as recited in claim 2, wherein said test leak is further equipped with a processor and data storage means, said EEPROM being linked to said processor and said data storage means.

7. A leak test apparatus as recited in claim 1, wherein the gas reservoir is located in a pressure vessel and an outer housing is provided for receiving said pressure vessel, wherein said outer housing includes said constriction as a component thereof.

8. A leak test apparatus as recited in claim 7, wherein the pressure vessel and outer housing are cylindrically shaped, said constriction being located in a face side of said housing and in which the face side opposite said face side having the constriction is equipped with a releasable screw cap.

9. A leak test apparatus as recited in claim 8, in which the outer housing includes a flange in the face side opposite said releasable cap, said flange projecting inwardly toward the interior of said housing for supporting the pressure vessel containing said gas reservoir.

10. A leak test apparatus as recited in claim 8, wherein the pressure vessel includes a ball valve disposed in the area of the releasable cap, said releasable cap carrying a pin which opens said ball valve when the cap is screwed in place.

11. A leak test apparatus as recited in claim 8, wherein said releasable cap carries a spike, said spike being oriented to penetrate said pressure vessel when the cap is screwed in place.

12. A leak test apparatus as recited in claim 8, wherein said releasable cap includes a rim having a bore defined in an upper side thereof.

13. A leak test apparatus as recited in claim 9, wherein the constriction is a diaphragm.

14. A leak test apparatus as recited in claim 13, wherein the flange carries said diaphragm.

15. A leak test apparatus as recited in claim 7, in which said outer housing is equipped in the area of said constriction with a pipe connection and in which the unoccupied end of said pipe connection forms said opening suited for introducing the intake point of said sniffer gun.

16. A leak test apparatus as recited in claim 1, wherein the leak test apparatus housing includes a port which is sized to permit said test leak to be selectively insertable into and removable from said apparatus housing through said port.

* * * * *